No. 702,993. Patented June 24, 1902.
M. PITTS.
BIRD CAGE.
(Application filed Feb. 14, 1901.)
(No Model.)

Witnesses
Edw Barnett
H. D. Gaither

Inventor
Mary Pitts
by Bond Adams Pickens & Jackson
her Attys

THE NORRIS PETERS CO., PHOTO-LITHO., WASHINGTON, D. C.

UNITED STATES PATENT OFFICE.

MARY PITTS, OF CHICAGO, ILLINOIS.

BIRD-CAGE.

SPECIFICATION forming part of Letters Patent No. 702,993, dated June 24, 1902.

Application filed February 14, 1901. Serial No. 47,209. (No model.)

*To all whom it may concern:*

Be it known that I, MARY PITTS, a citizen of the United States, residing at Chicago, in the county of Cook and State of Illinois, have invented certain new and useful Improvements in Bird-Cages, of which the following is a specification, reference being had to the accompanying drawings.

The nature of my invention consists in making a bird-cage separable in its parts by the devices and arrangements herein set forth, and that which I deem to be new is pointed out in the claim.

Figure 1:
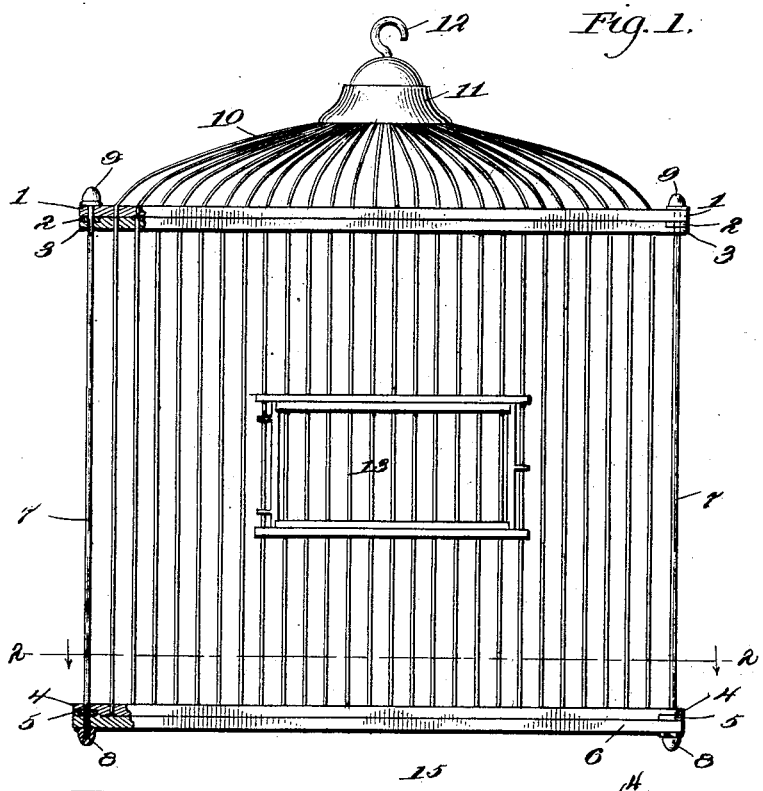
Figure 2:
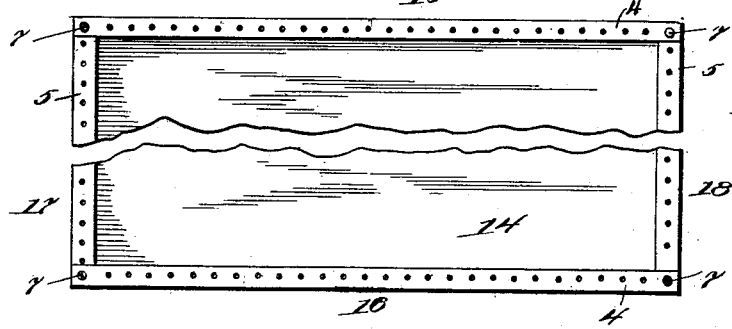
Figures 3, 4:
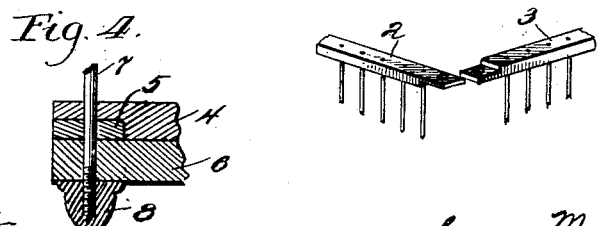

In the drawings, Figure 1 is a side view. Fig. 2 is a horizontal section on line 2 of Fig. 1. Fig. 3 is a detail showing the connection of the parts at the corners or angles, and Fig. 4 is a detail of the locking-support.

Referring to the drawings, 1 indicates the bars or supports for the top; 2, the upper bars of the end panel; 3, the upper bars of the side panel; 4, the lower bars of the side panel; 5, the lower bars of the end panel; 6, the bars upon which the bottom plate is supported; 7, the connecting or confining rods by which the parts are held together; 8, the feet or supports of the cage, which are screwed onto the lower ends of the connecting-rods; 9, heads of the connecting or confining rods; 10, the top; 11, the cover-plate for the inner junction of the wires from which the top is formed; 12, a suspending-hook; 13, the door; 14, the bottom plate; 15 16, side panels, and 17 18 end panels, of the cage.

The panels are composed of the upper and lower bars, as shown, and these bars are connected with wires or wooden rods, so as in each case to form a complete panel for the four sides of the cage when it is made square. It will be understood that the form may be oblong and the sides and ends may be swelled, so as to give the cage a circular form, as may be desired. The connecting or confining rods 7 are made of metal and are larger in cross-section than the wires forming the panels of the cage. The upper end 9 of these rods is formed into a head of any desired configuration. When the cage is to be put together, these rods are passed down through the upper bars, then through the lower bars, and the feet or supports 8 are screwed onto them, so as to bring and hold the parts compactly together and as tightly as may be desired. These nuts 8 also form the feet or supports for the cage when resting upon the floor or on a table. The bottom plate 14 is attached to the bar 6, and two of these bars, one upon each of the sides or ends, will be sufficient, although four may be employed if the cage is made of any considerable size. As these bars are placed upon the lower side of the bottom plate, it leaves the bottom in a condition to be easily cleaned when it is detached. The corners of the panels are put together by halving, as shown in Fig. 3, so that the connecting or confining rods when in place pass through all of the parts which are to be held together. The top 10 is also detachable; but as it is an entirety the bars 1 do not need to be halved together, but may be fastened together in any convenient manner. Any ordinary door 13 may be applied at either side or end.

It will be seen from the drawings that when the bolts or rods 7 are withdrawn the cage is detached into six separate and distinct parts— to wit, the four panels, the bottom, and the top—and by this arrangement the cage can be readily taken apart for cleaning or for transportation-packing.

What I claim as new, and desire to secure by Letters Patent, is—

In a bird-cage the combination of the separable side panels 15, 16, and separable end panels 17, 18, with a separable bottom, a separable top 10, vertically-extending confining-rods 7, engaging with the panels, bottom and top for detachably connecting them together and supports 8, substantially as specified.

MARY PITTS.

Witnesses:
 JULIA M. BRISTOL,
 HELEN M. COLLIN.